(12) United States Patent
Chan et al.

(10) Patent No.: US 7,952,678 B2
(45) Date of Patent: May 31, 2011

(54) LIQUID CRYSTAL PANEL HAVING PROTRUSIONS EMBEDDED IN SEALANT AND METHOD FOR MANUFACTURING SAME

(75) Inventors: Chia-Ming Chan, Miao-Li (TW);
Hung-Sheng Cho, Miao-Li (TW);
Kun-Hsing Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 627 days.

(21) Appl. No.: 11/999,220

(22) Filed: Dec. 3, 2007

(65) Prior Publication Data
US 2008/0129946 A1 Jun. 5, 2008

(30) Foreign Application Priority Data
Dec. 1, 2006 (TW) .............................. 95144721 A

(51) Int. Cl.
*G02F 1/1339* (2006.01)
(52) U.S. Cl. ....................................... 349/153; 349/190
(58) Field of Classification Search .................. 349/153, 349/190
See application file for complete search history.

(56) References Cited

U.S. PATENT DOCUMENTS

| | | | |
|---|---|---|---|
| 6,222,603 B1 | 4/2001 | Sakai et al. | |
| 6,704,072 B2 * | 3/2004 | Jeong et al. | 349/73 |
| 7,142,273 B1 * | 11/2006 | Zhang et al. | 349/139 |
| 7,609,359 B2 * | 10/2009 | Sekiguchi | 349/190 |
| 2006/0077334 A1 | 4/2006 | Kim et al. | |

FOREIGN PATENT DOCUMENTS

TW 200617487 A 6/2006

* cited by examiner

*Primary Examiner* — Dung T. Nguyen
(74) *Attorney, Agent, or Firm* — Wei Te Chung

(57) ABSTRACT

An exemplary liquid crystal panel (30) includes a first substrate (31), a second substrate (32), a liquid crystal layer (37), and a sealant (35). The first substrate includes a first base (310), a plurality of first protrusions (316), and a first orientation layer (315). The second substrate is parallel to the first substrate, and includes a second base (320). The sealant is disposed between the first base and the second base at a periphery of the liquid crystal panel. The first base, the second base, and the sealant cooperatively forming an accommodating space therebetween. The liquid crystal layer is disposed in the accommodating space. The first protrusions are disposed on or generally adjacent to the first base and are embedded in the sealant, and part of the first orientation layer is disposed at interspaces between the first protrusions. A method for manufacturing the liquid crystal panel is also provided.

20 Claims, 8 Drawing Sheets

LIQUID CRYSTAL PANEL HAVING PROTRUSIONS EMBEDDED IN SEALANT AND METHOD FOR MANUFACTURING SAME

CROSS-REFERENCE TO RELATED APPLICATION

This application is related to, and claims the benefit of, a foreign priority application filed in Taiwan as Serial No. 095144721 on Dec. 1, 2006. The related application is incorporated herein by reference.

FIELD OF THE INVENTION

The present invention relates to liquid crystal panels, and more particularly to a liquid crystal panel having protrusions embedded in a sealant thereof. The present invention also relates to a method for manufacturing the liquid crystal panel.

GENERAL BACKGROUND

Liquid crystal displays (LCDs) are widely used in various modern information products, such as notebooks, personal digital assistants, video cameras and the like. A typical LCD includes a liquid crystal panel, and a backlight module for providing illumination to the liquid crystal panel. Thereby, the LCD is capable of displaying images.

FIG. 13 is a schematic, side cross-sectional view of part of a conventional liquid crystal panel. The liquid crystal panel 10 includes a first substrate 11, a second substrate 12, a sealant 15, a plurality of spacers 16 (only one shown), and a liquid crystal layer 17. The second substrate 12 is parallel to the first substrate 11. The sealant 15 is disposed between the first substrate 11 and the second substrate 12. The sealant 15, the first substrate 11, and the second substrate 12 cooperatively form a closed accommodating space (not labeled) therebetween, for receiving the liquid crystal layer 17. The spacers 16 are dispersed in the accommodating space. A region of the liquid crystal panel 10 where the liquid crystal layer 17 is located is defined as an active area 18. A peripheral region of the liquid crystal panel 10 surrounding the active area 18 is defined as a non-active area 19.

The first substrate 11 includes a first base 110, a color filter layer 112, a light shield layer 113, an overcoat layer 118, a first electrode layer 114, and a first orientation layer 115. The first base 110 is a transparent plate, and is typically made of glass. The light shield layer 113 is disposed on the first base 110. The light shield layer 113 includes an inner light shield portion (not labeled) in the active area 18, and a peripheral light shield portion (not labeled) in the non-active area 19. The color filter layer 112 includes a plurality of red units R, a plurality of green units G, and a plurality of blue units B disposed regularly and separately at the inner light shield portion of the light shield layer 113. The overcoat layer 118 is disposed in the active area 18, and covers the color filter layer 112 and the inner light shield portion. The first electrode layer 114 serves as a common electrode, and covers the overcoat layer 118 and the light shield layer 113. The first orientation layer 115 is disposed on the first electrode layer 114. Thereby, the first orientation layer 115 is adjacent to the liquid crystal layer 17 in the active area 18, and the first orientation layer 115 adheres to the sealant 15 in the non-active area 19.

The second substrate 12 includes a second base 120, a plurality of thin film transistors (TFTs) 121 (only one shown), an insulating layer 122, a second electrode layer 124, and a second orientation layer 125. The second base 120 is a transparent plate, and is typically made of glass. The TFTs 121 are disposed on the second base 120. The insulating layer 122 covers the TFTs 121, so as to electrically insulate the TFTs 121 from other electronic components in the liquid crystal panel 10. The second electrode layer 124 is disposed on the insulating layer 122, and is configured to serve as a plurality of pixel electrodes of the liquid crystal panel 10. The second orientation layer 125 is disposed on the second electrode layer 124. Thereby, the second orientation layer 125 is adjacent to the liquid crystal layer 17 in the active area 18, and the second orientation layer 125 adheres to the sealant 15 in the non-active area 19.

In the liquid crystal panel 10, the sealant 15 and the first and second substrates 11, 12 cooperatively form the accommodating space for receiving the liquid crystal layer 17, with the sealant 15 directly contacting the first and second orientation layers 115 and 125. The material of the sealant 15 and the material of the first and second orientation layers 115 and 125 are usually different and somewhat incompatible. Therefore the sealant 15 may not be strongly adhered to the first and second orientation layers 115 and 125. That is, the adhesion between the sealant 15 and the orientation layers 115 and 125 may not be reliable. Therefore, the liquid crystal panel 10 is liable to become damaged and malfunction, particularly if the liquid crystal panel 10 is subjected to shock or vibration during use or transportation.

It is, therefore, desired to provide a liquid crystal panel that can overcome the above-described deficiencies. A method for manufacturing such liquid crystal panel is also needed.

SUMMARY

In a first aspect, a liquid crystal panel includes a first substrate, a second substrate, a liquid crystal layer, and a sealant. The first substrate includes a first base, a plurality of first protrusions, and a first orientation layer. The second substrate is parallel to the first substrate, and includes a second base. The sealant is disposed between the first base and the second base at a periphery of the liquid crystal panel. The first base, the second base, and the sealant cooperatively forming an accommodating space therebetween. The liquid crystal layer is disposed in the accommodating space. The first protrusions are disposed on or generally adjacent to the first base and are embedded in the sealant, and part of the first orientation layer is disposed at interspaces between the first protrusions.

In a second aspect, a method for manufacturing a liquid crystal panel includes: providing a first base and a second base; forming a plurality of first protrusions on a peripheral portion of the first base; forming a first orientation layer at an inner side of the first base, with part of the first orientation layer being at interspaces between the first protrusions; forming a sealant on the first base, with the first protrusions embedded in the sealant, the first base and the sealant cooperatively define an accommodating space; providing a liquid crystal layer in the accommodating space; and attaching the first base to the second base via the sealant.

In a third aspect, a liquid crystal panel includes a first substrate, a second substrate parallel to the first substrate, a liquid crystal layer between the first substrate and the second substrate, and a sealant surrounding the liquid crystal layer and bonding the first and second substrates together. The first substrate includes a plurality of protrusions and an orientation layer at an inner side thereof. The protrusions are embedded in the sealant, and portions of the orientation layer are located between the protrusions adjacent to the sealant.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
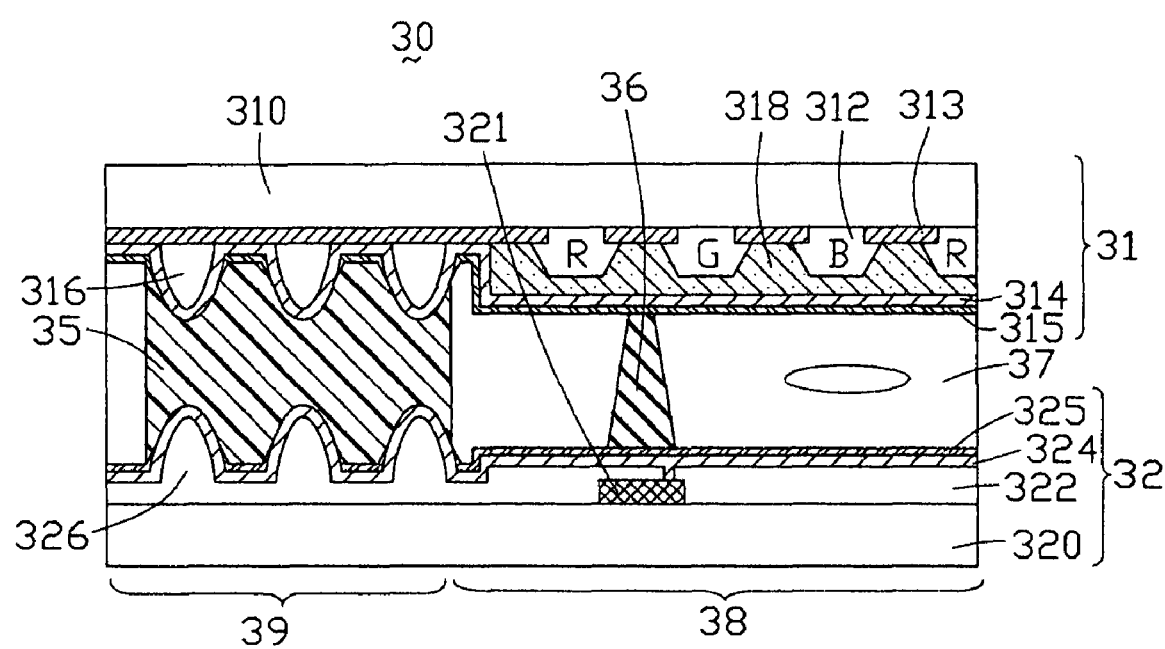
FIG. 1 is a side, cross-sectional view of part of a liquid crystal panel according to a first exemplary embodiment of the present invention, the liquid crystal panel including a first substrate and a second substrate.

FIG. 1 is a schematic, side cross-sectional view of part of a liquid crystal panel according to a first exemplary embodiment of the present invention. The liquid crystal panel 30 includes a first substrate 31, a second substrate 32, a sealant 35, a plurality of spacers 36 (only one space is shown), and a liquid crystal layer 37. The second substrate 32 is parallel to the first substrate 31. The sealant 35 is disposed between the first substrate 31 and the second substrate 32. The sealant 35, the first substrate 31, and the second substrate 32 cooperatively form a closed accommodating space (not labeled) therebetween. The liquid crystal layer 37 includes a plurality of liquid crystal molecules, and is sealed in the accommodating space. The spacers 36 are dispersed between the first and second substrates 31 and 32 in the accommodating space. The spacers 36 are used to maintain a constant gap between the first substrate 31 and the second substrate 32. A region of liquid crystal panel 30 at the accommodating space where the liquid crystal layer 37 is located is defined as an active area 38.

A peripheral region of liquid crystal panel 30 surrounding the active area 38 is defined as a non-active area 39.

The first substrate 31 is a so-called color filter (CF) substrate, and includes a first base 310, a color filter layer 312, a light shield layer 313, an overcoat layer 318, a first electrode layer 314, a first orientation layer 315, and a plurality of first protrusions 316.

The first base 310 is a transparent plate, and is typically made of glass. The first base 310 includes a top surface configured for being a display surface of the liquid crystal panel 30, and a bottom surface. The light shield layer 313 is made of black resin capable of absorbing light beams. The light shield layer 313 includes an inner light shield portion (not labeled) in the active area 38, and a peripheral light shield portion (not labeled) in the non-active area 39. The inner light shield portion is shaped to be a so-called black matrix. The color filter layer 312 includes a plurality of red units R, a plurality of green units G, and a plurality of blue units B. The red units R, the green units G, and the blue units B are disposed regularly, and separately, in the black matrix. The overcoat layer 318 is used to planarize a surface of the first substrate 31, and covers the color filter layer 312 and the black matrix in the active area 38.

Figure 2:
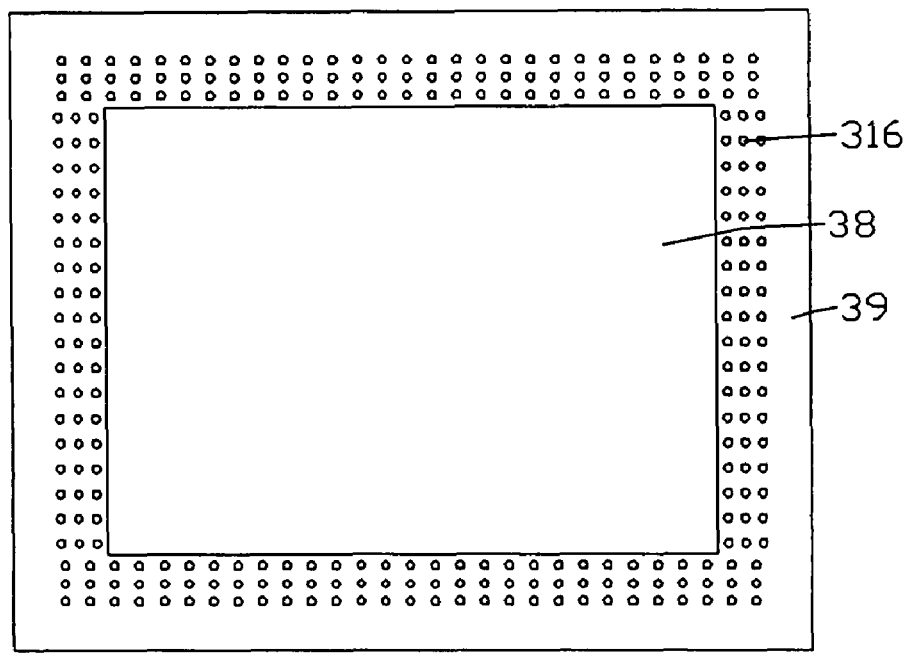
FIG. 2 is a bottom plan view of the first substrate of the liquid crystal panel of FIG. 1.

Also referring to FIG. 2, the first protrusions 316 are arranged on the peripheral light shield portion of the light shield layer 313, so as to form a generally rectangular, hollow array. Each border of the rectangular hollow array is adjacent to a corresponding edge of the first base 310. In particular, each long border of the array includes three rows of first protrusions 316, with the first protrusions 316 in each row being arranged in a line parallel to the corresponding edge of the first base 310. Each short border of the array includes three columns of first protrusions 316, with the first protrusions 316 in each column being arranged in a line parallel to the corresponding edge of the first base 310. Each of the first protrusions 316 is in the shape of a semi-ellipsoid, which extends from the peripheral light shield portion of the light shield layer 313. A base end of each first protrusion 316 has a round shape, with a diameter in the range from 10 μm (microns) to 20 μm. Each first protrusion 316 has a height in the range from 2 μm to 6 μm. A material of the first protrusions 316 is the same as that of the color filter layer 312.

The first electrode layer 314 is configured to be a common electrode of the liquid crystal panel 30. The first electrode layer 314 covers the overcoat layer 318, the first protrusions 316, and a portion of the light shield layer 313 not covered by either the first protrusions 316 or the overcoat layer 314. The first electrode layer 314 is made of transparent, electrically conductive material, such as indium tin oxide (ITO).

The first orientation layer 315 is configured to guide liquid crystal molecules in the liquid crystal layer 37 to align in predetermined directions. The first orientation layer 315 is provided on the first electrode layer 314, except for a part of the first electrode layer 314 covering the first protrusions 316. In detail, the first orientation layer 315 covers the first electrode layer 314 in the active area 38. In the non-active area 39, the first orientation layer 315 covers only certain portions of the first electrode layer 314, as follows. The first orientation layer 315 covers the first electrode layer 314 at a peripheral side of each border of the rectangular hollow array, such peripheral side being adjacent to the corresponding edge of the first base 310. The first orientation layer 315 also covers the first electrode layer 314 at interspaces between every two adjacent first protrusions 316.

The second substrate 32 is a so-called thin film transistor (TFT) substrate, and includes a second base 320, a plurality of TFTs 321 (only one shown), an insulating layer 322, a second electrode layer 324, a second orientation layer 325, and a plurality of second protrusions 326.

The second base 320 is a transparent plate, and is typically made of glass. The second base 320 includes a top surface facing toward the first substrate 31. The TFTs 321 are disposed on the top surface of the second base 320. Each TFT 321 corresponds to a respective pixel unit of the liquid crystal panel 30, and serves as a signal switch of the corresponding pixel unit. The insulating layer 322 covers the TFTs 321, so as to electrically insulate the TFTs 321 from other electronic components in the liquid crystal panel 30.

Figure 3:
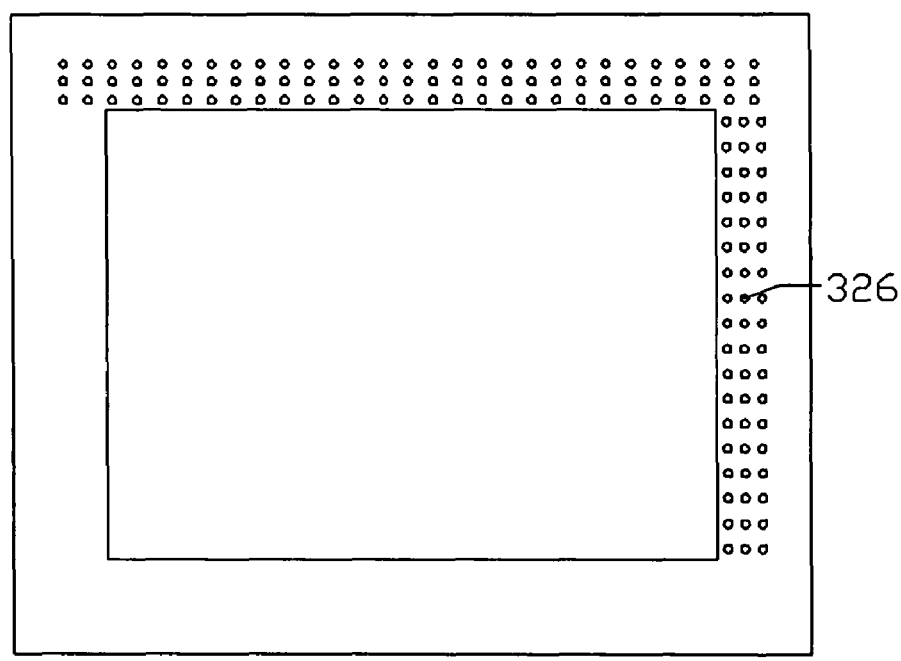
FIG. 3 is a top plan view of the second substrate of the liquid crystal panel of FIG. 1.

Also referring to FIG. 3, the second protrusions 326 are arranged in the non-active area 39 of the insulating layer 322, so as to form a generally L-shaped array. Each border of the L-shaped array is adjacent to a corresponding edge of the second base 320. A long border of the L-shaped array includes three rows of second protrusions 326, and the second protrusions 326 in each row are arranged in a line parallel to the corresponding edge of the second base 320. A short border of the L-shaped array includes three columns of second protrusions 326, and the second protrusions 326 in each column are arranged in a line parallel to the corresponding edge of the second base 320. Each second protrusion 326 is aligned directly below a respective first protrusion 316 of the first substrate 31, and has a shape and a size substantially the same as that of the first protrusion 316. In particular, all the second protrusions 326 integrally extend from the insulating layer 322. That is, a material of the second protrusions 326 is the same as that of the insulating layer 322, and can for example be silicon oxide or silicon nitride. The second protrusions 326 are arranged as the L-shaped array so that signal lines (not shown) in the active area 38 can extend to the non-active area 39 without obstruction by the second protrusions 326. Thereby, driving signals provided by peripheral driving members (not shown) of the liquid crystal panel 30 can be transmitted via the signal lines.

The second electrode layer 324 covers the insulating layer 322 and the second protrusions 326, and includes a plurality of pixel electrodes (not labeled). Each pixel electrode is disposed in a respective pixel unit, and connected to a corresponding thin film transistor 321. A material of the second electrode layer 324 is the same as that of the first electrode layer 314.

The second orientation layer 325 is also configured to guide liquid crystal molecules in the liquid crystal layer 37 to align in predetermined directions, and is disposed on the second electrode layer 324. The second orientation layer 325 is provided on the second electrode layer 324, except for a part of the second electrode layer 324 covering the second protrusions 326. In detail, the second orientation layer 325 covers the second electrode layer 324 in the active area 38. In the non-active area 39, the second orientation layer 325 covers only certain portions of the second electrode layer 324 as follows. The second orientation layer 325 covers the second electrode layer 324 at a peripheral side of each border of the L-shaped array, such peripheral side being adjacent to the corresponding edge of the second base 320. The second orientation layer 325 also covers the second electrode layer 324 at interspaces between every two adjacent second protrusions 326.

The sealant 35 is disposed in a region where the first protrusions 316 are located. Thereby, the first protrusions 316 and the second protrusions 326, together with the first electrode layer 314 and the second electrode layer 324 thereat, are embedded in the sealant 35. Thus most of the sealant 35 adheres to the first electrode layer 314 covering the exterior surfaces of the first protrusions 316, and adheres to the second electrode layer 324 covering the exterior surfaces of the second protrusions 326. Only part of the sealant 35 directly contacts the first orientation layer 315 and the second orientation layer 325. Preferably, the sealant 35 is made of resin that is compatible with ITO.

With this configuration, due to the first and second protrusions 316 and 326, most of the sealant 35 adheres to the electrode layers 314 and 324 covering the protrusions 316 and 326. The material of the sealant 35 can be compatible with that of the electrode layers 314 and 324, therefore the sealant 35 is capable of tightly adhering to the electrode layers 314 and 324. Moreover, the contact area between the sealant 35 and the electrode layers 312 and 324 is expanded due to the protrusions 316 and 326. This further strengthens the adhesion between the sealant 35 and the substrates 31 and 32. Even if the liquid crystal panel 30 is subjected to shock or vibration during use or transportation, the liquid crystal panel 30 resists damage. That is, the reliability of the liquid crystal panel 30 is improved.

Figure 4:
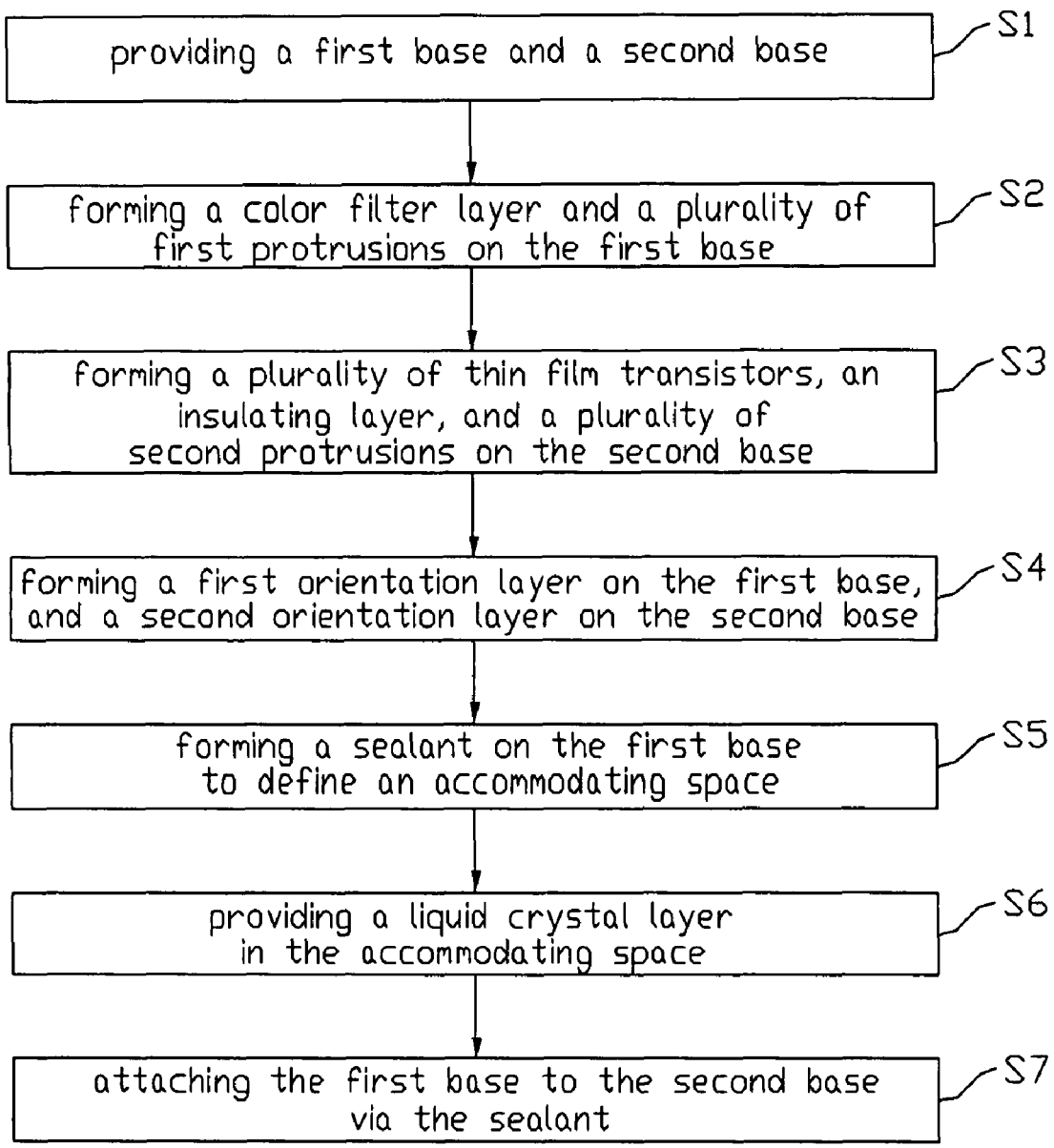
FIG. 4 is a flow chart of an exemplary method for manufacturing the liquid crystal panel of FIG. 1, the method including step S1, step S2, step S3, step S4, step S5, step S6, and step S7.

FIG. 4 is a flow chart of an exemplary method for manufacturing the liquid crystal panel 30. The method includes the following steps: S1, providing a first base 310 and a second base 320; S2, forming a color filter layer 312 and a plurality of first protrusions 316 on the first base 310; S3, forming a plurality of thin film transistors 321, an insulating layer 322, and a plurality of second protrusions 326 on the second base 320; S4, forming a first orientation layer 315 on the first base 310, and a second orientation layer 325 on the second base 320, respectively; S5, forming a sealant 35 on the first base 310 to define an accommodating space; S6, providing a liquid crystal layer 37 in the accommodating space; and S7, attaching the first base 310 to the second base 320 via the sealant 35.

In step S1, a first base 310 and a second base 320 are provided. The first base 310 and the second substrate 320 are both transparent plates, and are typically made of glass.

Figure 5:
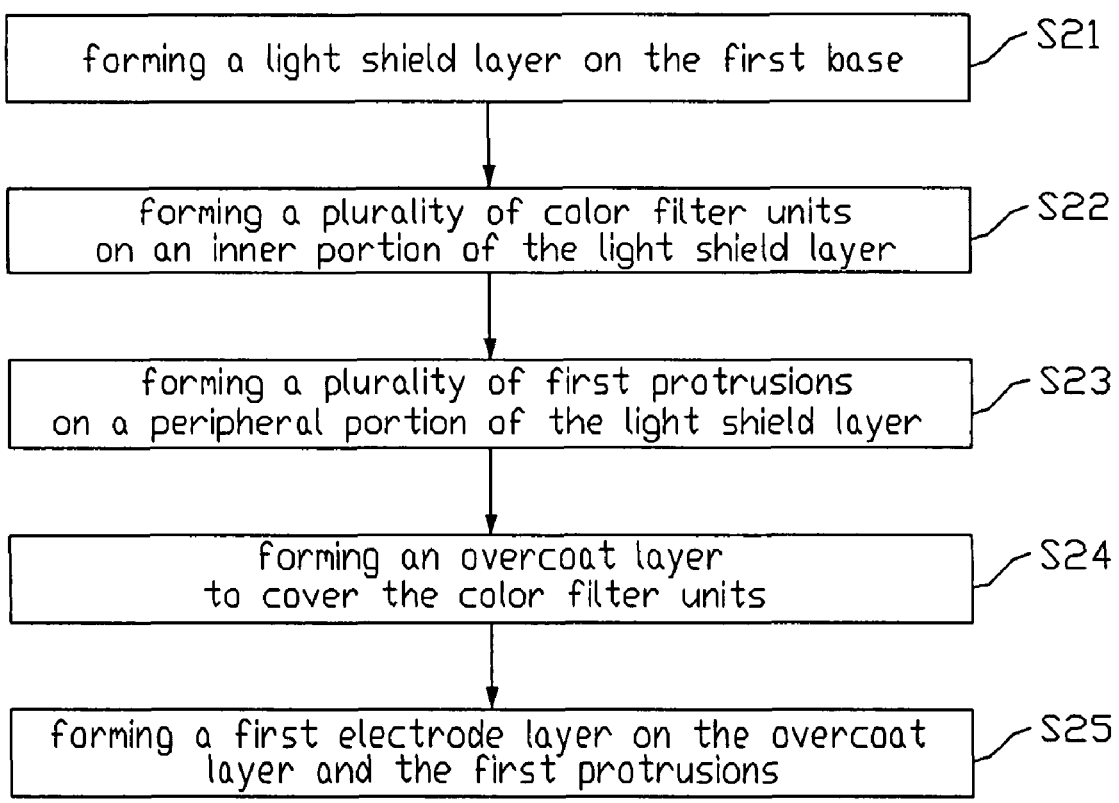
FIG. 5 is a flow chart of detailed processes of step S2 of the exemplary method for manufacturing the liquid crystal panel.

FIG. 5 is a flow chart of detail process of step S2 of the method of FIG. 4. Step S2 includes the following steps: S21, forming a light shield layer 313 on the first base 310; S22, forming a plurality of color filter units R, G, B on an inner portion of the light shield layer 313; S23, forming a plurality of first protrusions 316 on a peripheral portion of the light shield layer 313; S24, forming an overcoat layer 318 to cover the color filter units R, G, B; and S25, forming a first electrode layer 314 on the overcoat layer 318 and the first protrusions 316.

In step S21, the light shield layer 313 is formed on the first base 310, with an inner portion thereof being shaped as a matrix, and a peripheral portion thereof adjacent to the edges of the first base 310. The light shield layer 311 is made of black resin capable of absorbing light beams.

In step S22, a plurality of red units R, a plurality of green units G, and a plurality of blue units B are regularly and separately formed at the inner portion of the light shield layer 313. After step S22, a color filter layer 312 is formed.

In step S23, the first protrusions 316 are formed at the peripheral portion of the light shield layer 313, defining a generally rectangular hollow array. Each first protrusion 316 is patterned to have a semi-ellipsoidal shape, which has a height from 2 μm to 6 μm, and a diameter of a round-shaped end from 10 μm to 20 μm. Moreover, a material of the first protrusions 316 is the same as that of the color filter layer 312. In particular, the first protrusions 316 can be formed during the manufacturing step of forming the color filter units R, G, B, that is, step S23 can be merged into step S22.

In step S24, the overcoat layer 318 is formed, and covers the inner portion of the light shield layer 313 and the color filter layer 312.

In step S25, the first electrode layer 314 are formed on the entire first base 310, so that the overcoat layer 318 and the first protrusions 316 are both covered by the first electrode layer 314. The electrode layer 314 is made of transparent, electrically conductive material, such as ITO.

Figure 6:
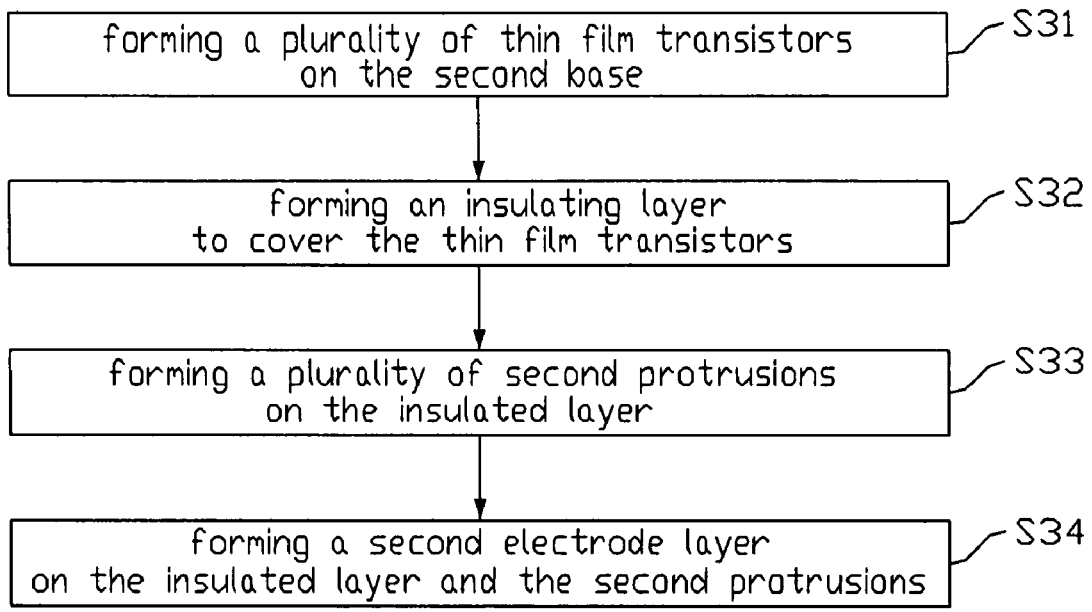
FIG. 6 is a flow chart of detailed processes of step S3 of the exemplary method for manufacturing the liquid crystal panel.

FIG. 6 is a flow chart of detail process of step S3 of the method of FIG. 4. Step S3 includes the following steps: S31, forming a plurality of thin film transistors (TFTs) 321 on the second base 320; S32, forming an insulating layer 322 to cover the thin film transistors 321; S33, forming a plurality of second protrusions 326 on the insulating layer 322; and S34, forming a second electrode layer 324 on the insulating layer 322 and the second protrusions 326.

In step S31, the TFTs 321 are formed on the second base 320 via photolithography technology.

In step S32, the insulating layer 322 are formed to cover the TFTs 321 and electrically insulate the TFTs 321 from other electronic components. Typically, the insulating layer 322 is made of silicon oxide or silicon nitride.

In step S33, the second protrusions 326 are formed at two adjacent sides of peripheral portion of the insulating layer 322, defining a substantially L-shaped array. A shape and a size of each second protrusion 326 are patterned to be substantially the same as that of the first protrusion 316. Moreover, material of the second protrusions 326 is the same as that of the insulating layer 322. Particularly, the second protrusions 326 can be integrally formed during the manufacturing process of forming the insulating layer 322 in step S32. That is, step S33 can be merged into step S32, the insulating layer 322 is formed on the entire second base 320, and then the peripheral portion of the insulating layer 322 is patterned to form the second protrusions 326.

In step S34, firstly an electrically conductive layer is formed on the entire second base 32. The electrically conductive layer is made of transparent material such as ITO. Secondly, the electrically conductive layer is patterned, so as to form a plurality of pixel electrodes 324 covering the insulating layers 322, and a peripheral portion covering the second protrusions 326.

Figure 7:
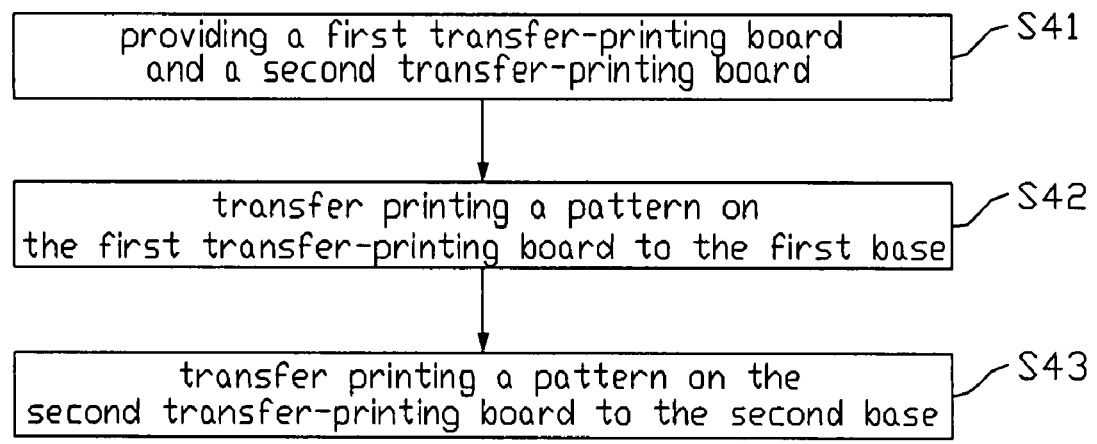
FIG. 7 is a flow chart of detailed processes of step S4 of the exemplary method for manufacturing the liquid crystal panel, such detailed processes including step S41, step S42, and step S43.

FIG. 7 is a flow chart of detail process of step S4 of the method of FIG. 4. Step S4 includes the following steps: S41, providing a first transfer-printing board and a second transfer-printing board; S42, transfer printing a pattern on the first transfer-printing board to the first base 31; and S43, transfer printing a pattern on the second transfer-printing board to the second base 32.

Figure 8:
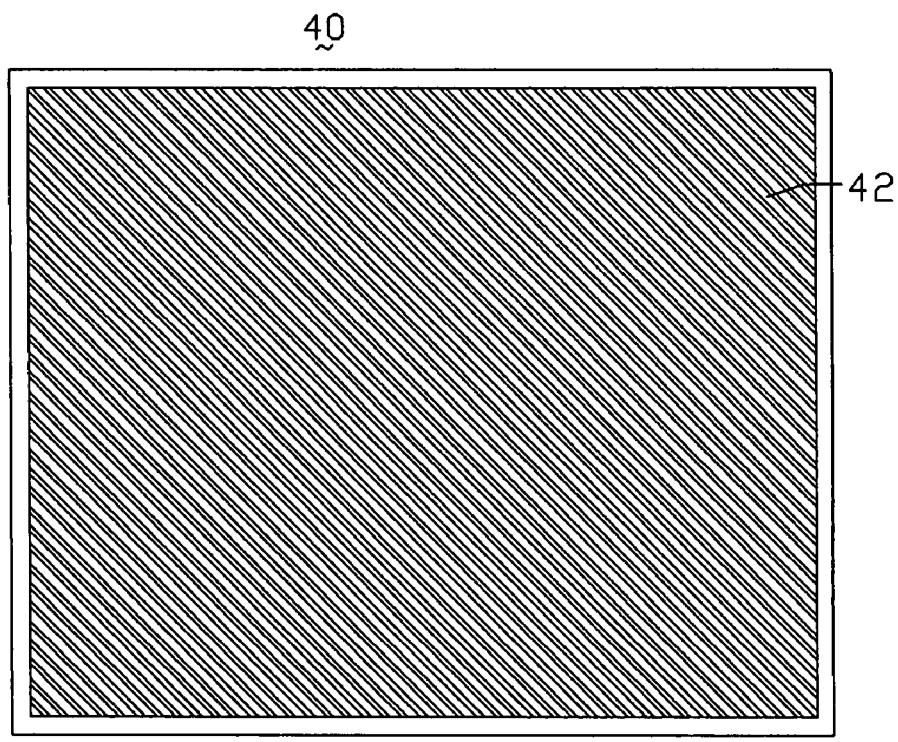
FIG. 8 is a schematic, plan view of a first transfer printing board provided in step S41 of FIG. 7.
Figure 9:
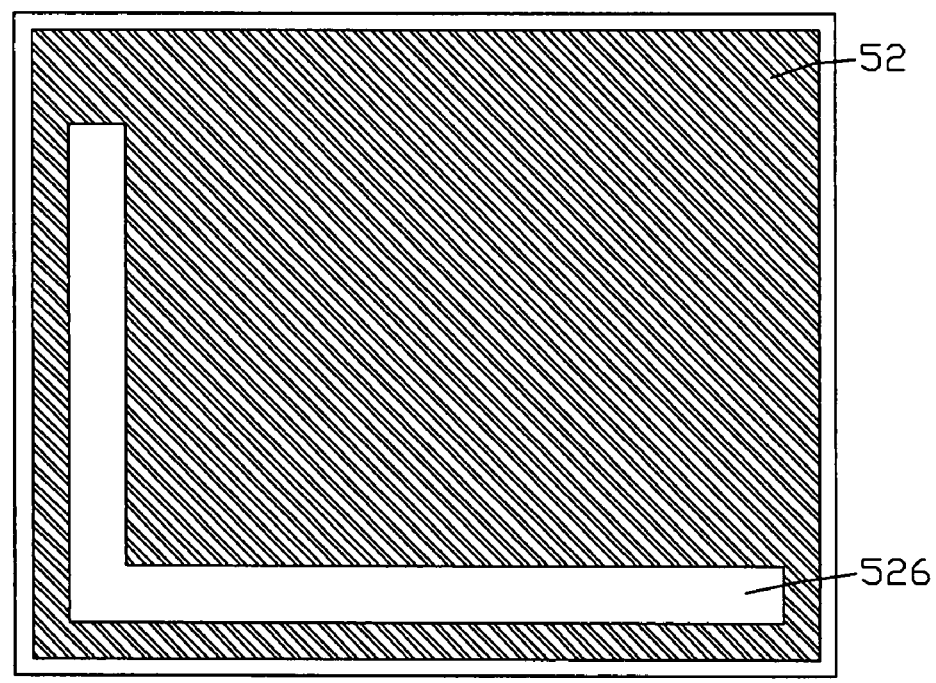
FIG. 9 is a schematic, plan of a second transfer printing board provided in step S41 of FIG. 7.

Also referring to FIGS. 8-9, in step S41, a first transfer-printing board 40 and a second transfer-printing board 50 are provided. The first transfer-printing board 40 includes a first orientation material 42 disposed thereon. The first orientation material 42 is in a liquid state, and is arranged as a rectangular pattern corresponding to the first base 310. The second transfer-printing board 50 includes a second orientation material 52 disposed thereon. The second orientation material 52 is the same as the first orientation material 42, and is disposed as a rectangular pattern having an L-shaped blank 526. Moreover, in the L-shaped blank 526, the second orientation material 52 is removed. Each border of the L-shaped blank 526 is adjacent to a corresponding edge of the second transfer-printing board 50.

In step S42, the rectangular pattern of the first orientation material 42 of the first transfer printing board 40 is transfer printed onto the first electrode layer 314 formed on the first base 310. Thereby, the entire first electrode layer 314 is fully covered by the first orientation material 42. Because the first orientation material 42 is in a liquid state, part of the first orientation material 42 then flows along the parts of the first electrode layer 314 that are disposed on the first protrusions 316, and gathers at interspaces between adjacent first protrusions 316. The first orientation material 42 is then solidified and rubbed to form grooves thereon. Once step S42 is completed, a first substrate 31 is thereby obtained.

In step S43, the rectangular pattern having the L-shaped blank 526 of the second orientation material 52 of the second transfer-printing board 50 is transfer printed onto the second electrode layer 324 formed on the second base 320. The L-shaped blank 526 is positioned without any superposition with the L-shaped array of the second protrusions 326. Similar to step S42, the second orientation material 52 is formed on the second electrode layer 324, except for the parts of the second electrode layer 324 covering the exterior surface of the second protrusions 326, as well as the parts of the second electrode layer 324 in a region where the L-shaped blank 526 is located. That is, part of the second orientation material 52 gathers at interspaces between adjacent second protrusions 326. The second orientation material 52 is then solidified and rubbed to form grooves thereon. Once step S43 is completed, a second substrate 32 is thereby obtained.

In step S5, a sealant 35 is formed in a region where the first protrusions 316 are located, and accordingly an accommodating space is defined. Moreover, the first protrusions 316, together with the first electrode layer 314 thereat, are embedded into the sealant 35 and adhere to the sealant 35. The sealant 35 is typically made of resin that is compatible with the first and second electrode layers 314 and 324.

In step S6, a liquid crystal layer 37 is provided in the accommodating space via one drop fill (ODF). Moreover, a plurality of spacers 36 are dispersed in the liquid crystal layer 37.

In step S7, the second substrate 32 is attached to the first substrate 31 via the sealant 35, with the second protrusions 326 also embedded in the sealant 35. Therefore, each of the second protrusions 326 is aligned substantially directly opposite to a corresponding first protrusion 316 in the first substrate 31. The liquid crystal layer 37, together with the spacers 36 therein, are received between the first substrate 31 and the second substrate 32, and the liquid crystal panel 30 is formed.

In the above-described method for manufacturing the liquid crystal panel 30, the first protrusions 316 and the second protrusions 326 are respectively formed on the first base 310 and the second base 320. Due to the first protrusions 316 and the second protrusions 326, during the forming the first orientation layer 315 and the second orientation layer 325, parts of the orientation material 42, 52 flow along the electrode layers 314, 324 covering the exterior surfaces of the protrusions 316, 326, and little or even no orientation material stay on the electrode layers 314, 324 covering the protrusions 316, 326. Therefore, after the manufacturing process, most of the sealant 35 adheres to the electrode layers 314, 324. Because material of the sealant 35 can be compatible with that of the electrode layers 314, 324, therefore the sealant 35 can tightly adhere to the electrode layers 314, 324, and the reliability of the liquid crystal panel 30 is improved. Moreover, the contacting area between the sealant 35 and the electrode layers 312, 324 is expanded due to the protrusions 316, 326. This further strengthens the adhesion between the sealant 35 and the substrates 31 and 32.

Figure 10:
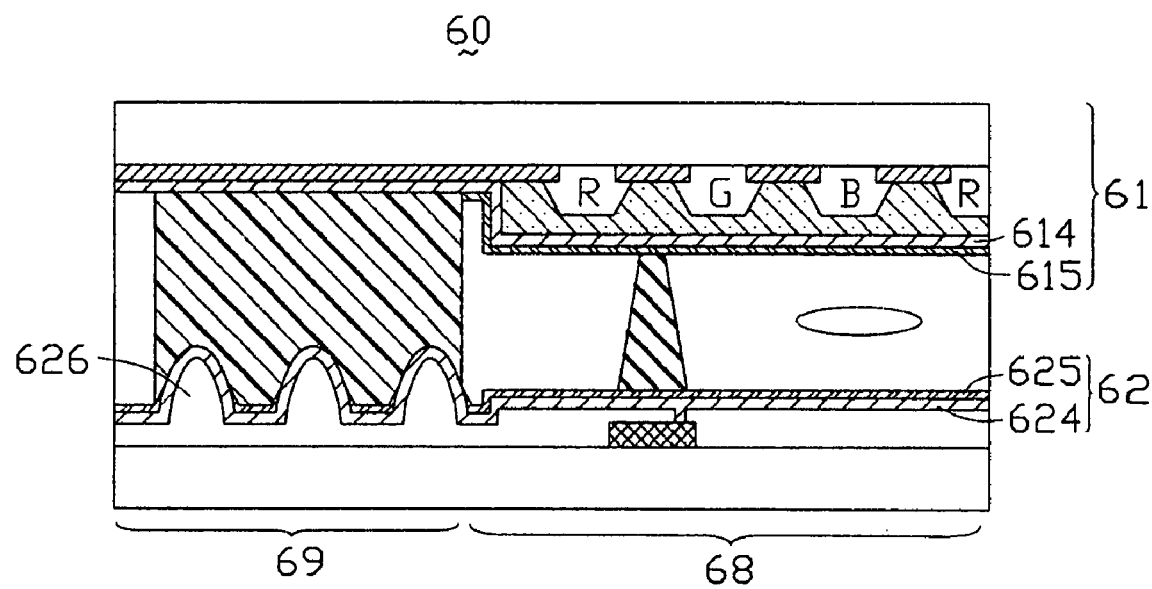
FIG. 10 is a side, cross-sectional view of part of a liquid crystal panel according to a second exemplary embodiment of the present invention.

FIG. 10 is a schematic, cross-sectional view of a liquid crystal panel according to a second exemplary embodiment of the present invention. The liquid crystal panel 60 is similar to the liquid crystal panel 30. However, the liquid crystal panel 60 includes a first substrate 61, a second substrate 62, and a sealant 67. The first substrate 61, the second substrate 62, and the sealant 67 cooperatively define a main central active area 68 of the liquid crystal panel 60, and a non-active area 69 of the liquid crystal panel 60 surrounding the active area 68.

The first substrate 61 includes a first electrode layer 614, and a first orientation layer 615 disposed in the active area 68. The second substrate 62 includes a plurality of protrusions 626, a second electrode layer 624, and a second orientation layer 625. The protrusions 626 are in the shape as a semi-ellipsoid, and are covered by the second electrode layer 624. Part of the second orientation layer 625 is disposed at interspaces between the protrusions 626. A top side of the sealant 65 adheres to the first electrode layer 615 in the non-active area 69 directly. A bottom side of the sealant 65 adheres to the second electrode layer 625 covering the protrusions 626, as well as the part of the orientation layer 625 at the interspaces between the protrusions 626.

Figure 11:
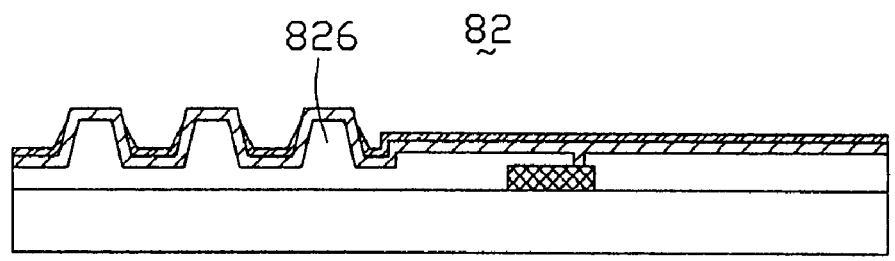
FIG. 11 is a side, cross-sectional view of part of a substrate of a liquid crystal panel according to a third exemplary embodiment of the present invention.

FIG. 11 is a schematic, cross-sectional view of a substrate of a liquid crystal panel according to a third exemplary embodiment of the present invention. The substrate 82 is similar to the second substrate 32 of the liquid crystal panel 30. However, the substrate 82 includes a plurality of protrusions 826. Each of the protrusions 826 is in the shape of a conic frustum.

Figure 12:
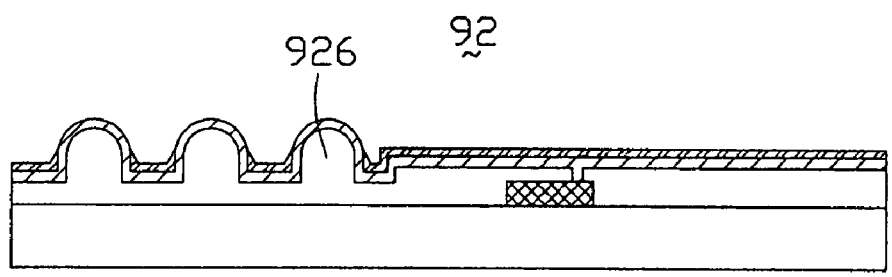
FIG. 12 is a side, cross-sectional view of part of a substrate of a liquid crystal panel according to a fourth exemplary embodiment of the present invention.
Figure 13:
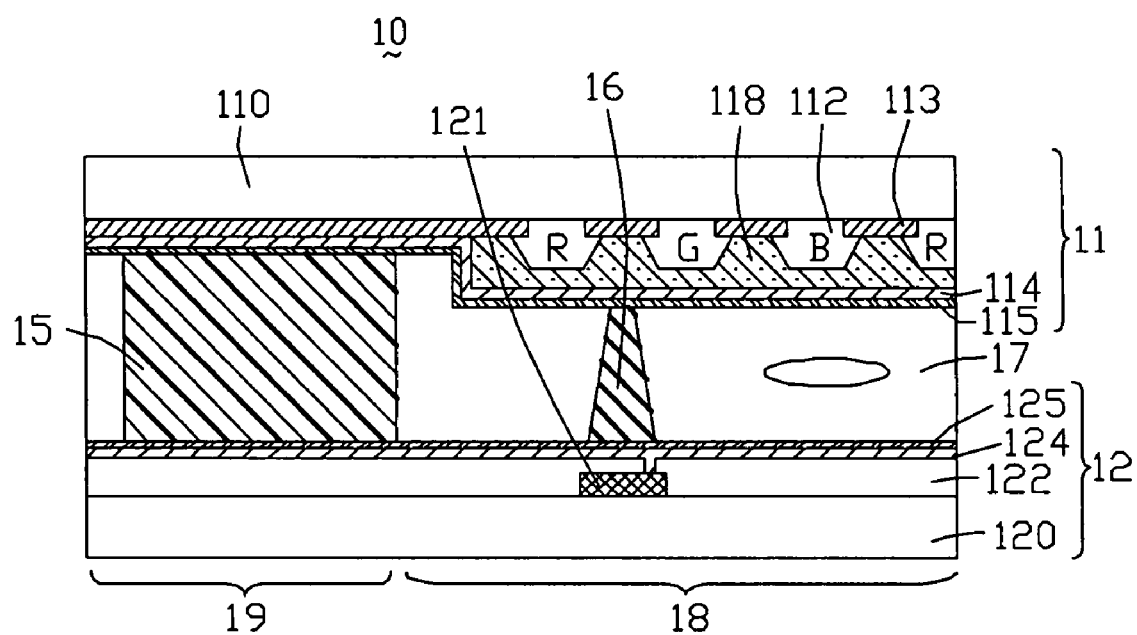
FIG. 13 is a side, cross-sectional view of part of a conventional liquid crystal panel.

FIG. 12 is a schematic, cross-sectional view of a substrate of a liquid crystal panel according to a fourth exemplary embodiment of the present invention. The substrate 92 is similar to the second substrate 62 of the liquid crystal panel 60. However, the substrate 92 includes a plurality of protrusions 926. Each of the protrusions 926 is generally in the shape of a cylinder with a hemispherical (or hemispheroidal) top.

Furthermore, the protrusions 316, 326, 626, 826, 926 can each instead be in the shape of a cone, a pyramid, a pyramidal frustum, a hemispheroid, and the like, as long as an incline surface for adhering to a corresponding sealant is provided.

It is to be further understood that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A liquid crystal panel, comprising:
    a first substrate comprising a first base, a plurality of first protrusions at a periphery of an inner surface of the first base, and a first orientation layer;
    a second substrate parallel to the first substrate, the second substrate comprising a second base;
    a sealant disposed between the first base and the second base at a periphery of the liquid crystal panel, the periphery of the liquid crystal panel corresponding to the periphery of the inner surface of the first base, the first base, the second base, and the sealant cooperatively forming an accommodating space therebetween; and
    a liquid crystal layer in the accommodating space;
    wherein the first protrusions are disposed on or generally adjacent to the periphery of the inner surface of the first base and are embedded in the sealant, and part of the first orientation layer is disposed at interspaces between the first protrusions with main bodies of the first protrusions exposed beyond the first orientation layer.

2. The liquid crystal panel as claimed in claim 1, wherein each of the first protrusions has a height in a range from 2 microns to 6 microns.

3. The liquid crystal panel as claimed in claim 1, wherein each of the first protrusions comprises a round-shaped end adjacent to the first base, and the end of the first protrusion has a diameter in a range from 10 microns to 20 microns.

4. The liquid crystal panel as claimed in claim 1, wherein each of the first protrusions is in the shape of one of a semi-ellipsoid, a conic frustum, and a cylinder having a hemispheroidal top.

5. The liquid crystal panel as claimed in claim 1, wherein the first protrusions are arranged to form a general rectangular hollow array, and each border of the rectangular hollow array is adjacent to an edge of the first substrate.

6. The liquid crystal panel as claimed in claim 5, wherein each border of the rectangular hollow array comprises three lines of first protrusions, and each line is parallel to the corresponding edge of the first base.

7. The liquid crystal panel as claimed in claim 1, wherein the first substrate further comprises a first electrode layer, and part of the first electrode layer covers the first protrusions and is embedded in the sealant.

8. The liquid crystal panel as claimed in claim 7, wherein the first orientation layer is disposed on the first electrode layer at the interspaces between the first protrusions.

9. The liquid crystal panel as claimed in claim 1, wherein the second substrate further comprises a plurality of second protrusions at a periphery of an inner surface of the second base, and a second orientation layer, the second protrusions are disposed on or generally adjacent to the second base and are embedded in the sealant, and part of the second orientation layer is disposed at interspaces between the second protrusions with main bodies of the second protrusions exposed beyond the second orientation layer.

10. The liquid crystal panel as claimed in claim 9, wherein each of the second protrusions has a shape and a size substantially the same as that of each of the first protrusions.

11. The liquid crystal panel as claimed in claim 9, wherein the second protrusions are arranged to form an L-shaped array, each border of the L-shaped array is adjacent to an edge of the second substrate and comprises three lines of first protrusions, and each line is parallel to the corresponding edge of the second base.

12. The liquid crystal panel as claimed in claim 9, wherein each of the second protrusions is aligned substantially directly opposite to a respective first protrusion.

13. The liquid crystal panel as claimed in claim 1, wherein the first substrate further comprises a color filter layer corresponding to the liquid crystal layer, and the first protrusions are made of the same material as the color filter layer and are formed in the same manufacturing step as the color filter layer.

14. A liquid crystal panel, comprising:
    a first substrate comprising a plurality of protrusions and an orientation layer at an inner side thereof;
    a second substrate parallel to the first substrate;
    a liquid crystal layer between the first substrate and the second substrate; and
    a sealant surrounding the liquid crystal layer and bonding the first and second substrates together;
    wherein the protrusions are embedded in the sealant, and portions of the orientation layer are located at interspaces between the protrusions with main bodies of the protrusions exposed beyond the orientation layer.

15. The liquid crystal panel as claimed in claim 14, wherein the portions of the orientation layer located at the interspaces between the protrusions do not cover the main bodies of the protrusions.

16. The liquid crystal panel as claimed in claim 15, wherein the first substrate further comprises an electrode layer, and part of the electrode layer covers the protrusions and is embedded in the sealant.

17. The liquid crystal panel as claimed in claim 16, wherein the orientation layer is disposed on the electrode layer at the interspaces between the protrusions.

18. The liquid crystal panel as claimed in claim 15, wherein the orientation layer is formed by covering a liquid state orientation material on the inner side of the first substrate, with part of the liquid state orientation material covering the main bodies of the protrusions flowing along a shape of the main bodies of the protrusions to gather at the interspaces between the protrusions.

19. The liquid crystal panel as claimed in claim 1, wherein the part of the first orientation layer at the periphery of the inner surface of the first base is disposed only in the interspaces between the first protrusions.

20. The liquid crystal panel as claimed in claim 19, wherein the first orientation layer is formed by covering a liquid state orientation material on the first base, with part of the liquid state orientation material covering the main bodies of the first protrusions flowing along a shape of the main bodies of the first protrusions to gather at the interspaces between the first protrusions.

* * * * *